(12) United States Patent
Lee et al.

(10) Patent No.: US 8,081,282 B2
(45) Date of Patent: Dec. 20, 2011

(54) LIQUID CRYSTAL DISPLAY DEVICE

(75) Inventors: Seung-hee Lee, Jeonju-si (KR); Ji-won Sohn, Seoul (KR); Yeon-mun Jeon, Iksan-si (KR); Seong-jin Hwang, Gimje-si (KR); Jae-jin Lyu, Yongin-si (KR)

(73) Assignees: Samsung Electronics Co., Ltd., Suwon-si (KR); Industrial Cooperation Foundation of Chonbuk National University, Jeonju-si (KR)

( * ) Notice: Subject to any disclaimer, the term of this patent is extended or adjusted under 35 U.S.C. 154(b) by 1049 days.

(21) Appl. No.: 11/950,304

(22) Filed: Dec. 4, 2007

(65) Prior Publication Data

US 2008/0246908 A1 Oct. 9, 2008

(30) Foreign Application Priority Data

Apr. 5, 2007 (KR) .................. 10-2007-0033731

(51) Int. Cl.
*G02F 1/1343* (2006.01)
*G02F 1/1337* (2006.01)
*G02F 1/136* (2006.01)

(52) U.S. Cl. .......... 349/144; 349/129; 349/48; 349/145; 349/146

(58) Field of Classification Search ............ 349/48, 349/129, 144–146
See application file for complete search history.

(56) References Cited

U.S. PATENT DOCUMENTS

| 2003/0048401 A1 | 3/2003 | Kataoka |
| 2005/0078263 A1 | 4/2005 | Kim |
| 2005/0162596 A1 | 7/2005 | Kim et al. |
| 2006/0066795 A1 | 3/2006 | Hsu |
| 2006/0164352 A1* | 7/2006 | Yoo et al. ............... 345/87 |
| 2007/0070278 A1 | 3/2007 | Do |
| 2007/0247559 A1* | 10/2007 | Tasaka et al. ............ 349/46 |

FOREIGN PATENT DOCUMENTS

| EP | 1762884 A1 | 3/2007 |
| JP | 2002-372715 | 12/2002 |
| JP | 2003-195328 | 7/2003 |
| JP | 2005-316331 | 11/2005 |
| JP | 2006-119405 | 5/2006 |

(Continued)

OTHER PUBLICATIONS

European Search Report dated Jun. 20, 2008.

*Primary Examiner* — Wen-Ying P Chen
(74) *Attorney, Agent, or Firm* — H.C. Park & Associates, PLC

(57) ABSTRACT

A liquid crystal display device includes a first substrate having a gate line and two data lines crossing with the gate line to define a pixel, a first pixel electrode connected to the gate line and the first data line, and a second pixel electrode connected to the gate line and the second data line. A second substrate opposes the first substrate and includes a common electrode having a common electrode cutting pattern. The pixel electrode includes a pixel electrode cutting pattern to form domains and sub domains in the pixel with the common electrode cutting pattern. A liquid crystal layer is arranged between the first and second substrates. The pixel electrodes include bent portions. The pixel electrode and the common electrode include sub cutting patterns extending towards the sub domains at the bent portions.

20 Claims, 16 Drawing Sheets

FOREIGN PATENT DOCUMENTS

| | | |
|---|---|---|
| JP | 2006-171484 | 6/2006 |
| KR | 10-2005-0100959 | 10/2005 |
| KR | 10-2006-0018401 | 3/2006 |
| KR | 10-2006-0077896 | 7/2006 |
| KR | 10-2006-0100090 | 9/2006 |
| KR | 10-2006-0111771 | 10/2006 |
| KR | 10-2006-0116580 | 11/2006 |

* cited by examiner

LIQUID CRYSTAL DISPLAY DEVICE

CROSS REFERENCE TO RELATED APPLICATION

This application claims priority from and the benefit of Korean Patent Application No. 10-2007-0033731, filed on Apr. 5, 2007, which is hereby incorporated by reference for all purposes as if fully set forth herein.

BACKGROUND OF INVENTION

1. Field of the Invention

The present invention relates to a liquid crystal display device, and more specifically, to a liquid crystal display device having enhanced transmittance.

2. Discussion of the Background

In general, a liquid crystal display (LCD) device includes a first substrate with thin film transistors, a second substrate oppositely disposed to the first substrate, and a liquid crystal layer disposed between the first substrate and the second substrate.

To widen a viewing angle of the LCD device, a patterned vertically aligned (PVA) mode and a multi-domain vertically aligned (MVA) mode have been developed. In the PVA mode and the MVA mode, a cutting pattern or a protrusion is provided on a pixel electrode and a common electrode. The cutting pattern or the protrusion adjusts the alignment of liquid crystal molecules in the liquid crystal layer due to an applied electric field, thereby enhancing the viewing angle.

However, electric fields may disrupt each other according to arrangements of the cutting pattern or the protrusion. In this case, the liquid crystal molecules arranged where the different electric fields disrupt each other are not smoothly controlled, and may result in deteriorated transmittance of light through the liquid crystal layer.

SUMMARY OF THE INVENTION

This invention provides a liquid crystal display device having enhanced transmittance.

Additional aspects of the present invention will be set forth in part in the description which follows and, in part, will be obvious from the description, or may be learned by practice of the present invention.

The present invention discloses a liquid crystal display device including a first substrate which includes a gate line and a data line insulated from and crossing with each other, and a pixel electrode connected to the gate line and the data line and including a pixel electrode cutting pattern; a second substrate arranged opposite to the first substrate and including a common electrode having a common electrode cutting pattern; and a liquid crystal layer arranged between the first substrate and the second substrate. The pixel electrode includes a first region and a second region separated from each other at a boundary region and extending in different directions, and at least one of the pixel electrode and the common electrode includes a sub cutting pattern extending from the boundary region towards at least one of the first region and the second region.

The present invention also discloses a liquid crystal display device including a first substrate including a gate line and a data line insulated from and crossing with each other, and a pixel electrode connected to the gate line and the data line and including a pixel electrode cutting pattern, a second substrate arranged opposite to the first substrate and including a common electrode including a common electrode cutting pattern, and a liquid crystal layer arranged between the first substrate and the second substrate. The pixel electrode includes sub domains divided by the pixel electrode cutting pattern and the common electrode cutting pattern. The sub domains include a first sub domain having a liquid crystal director disposed in a first direction; and a second sub domain separated from the first sub domain at a boundary region and having a liquid crystal director disposed in a second direction different than the first direction, and at least one of the pixel electrode and the common electrode comprises a sub cutting pattern extending from the boundary region towards at least one of the first sub domain and the second sub domain.

The present invention also discloses a liquid crystal display device including a first substrate including a gate line and a data line insulated from and crossing with each other, and a pixel electrode connected to the gate line and the data line and having a pixel electrode cutting pattern, a second substrate arranged opposite to the first substrate and including a common electrode having a common electrode cutting pattern, and a liquid crystal layer arranged between the first substrate and the second substrate. The pixel electrode includes a first region and a second region extending from the first region and bent with respect to the first region, and a sub cutting pattern is arranged in at least one of the pixel electrode and the common electrode. The sub cutting pattern includes a first part extending from a boundary region between the first region and the second region towards the first region, and a second part extending from the boundary region towards the second region.

The present invention also discloses a liquid crystal display device including a first substrate including a gate line and a data line insulated from and crossing with each other, and a pixel electrode connected to the gate line and the data line, a second substrate arranged opposite to the first substrate and including a common electrode, and a liquid crystal layer arranged between the first substrate and the second substrate. The pixel electrode includes a first sub domain having a liquid crystal director disposed in a first direction, a second sub domain neighboring the first sub domain along an extension direction of the data line, and having a liquid crystal director disposed in a second direction different than the first direction, and at least one of the first substrate and the second substrate including a sub domain divider extendi from a boundary region between the first sub domain and the second sub domain towards at least one of the first sub domain and the second sub domain.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
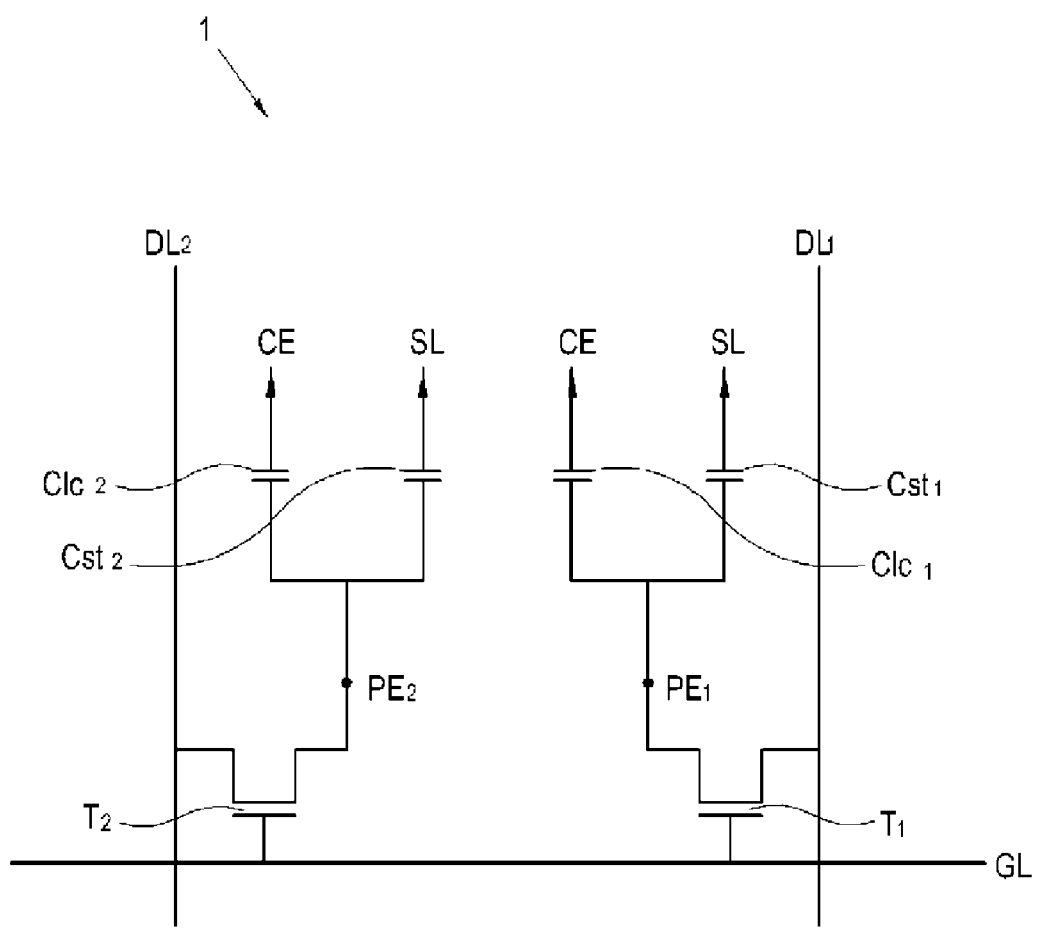
FIG. 1 is an equivalent circuit diagram of one pixel in an LCD device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Reference will now be made in detail to the exemplary embodiments of the present invention, shown in the accompanying drawings.

FIG. 1 is an equivalent circuit diagram of one pixel in an LCD device according to a first exemplary embodiment of the present invention.

In a pixel of the LCD device 1, a first thin film transistor T1 is connected to a first data line DL1 and a gate line GL, and a second thin film transistor T2 is connected to a second data line DL2 and the gate line GL The first thin film transistor T1 and the second thin film transistor T2 are connected to one gate line GL, and are thus driven simultaneously. However, the first thin film transistor T1 and the second thin film transistor T2 are connected to the first data line DL1 and the second data line DL2, respectively, and thus can receive different data voltages.

A first liquid crystal capacitor $C_{LC1}$ and a second liquid crystal capacitor $C_{LC2}$ are connected to the first thin film transistor T1 and the second thin film transistor T2, respectively, and a first storage capacitor $C_{st1}$ and a second storage capacitor $C_{st2}$ are connected to the first thin film transistor T1 and the second thin film transistor T2, respectively. The first liquid crystal capacitor $C_{LC1}$ and the second liquid crystal capacitor $C_{LC2}$ are formed between a common electrode CE and a first pixel electrode PE1, and between the common electrode CE and a second pixel electrode PE2, respectively. The first storage capacitor $C_{st1}$ and the second storage capacitor $C_{st2}$ are formed between a storage capacitance line SL and the first pixel electrode PE1, and between the storage capacitance line SL and the second pixel electrode PE2, respectively.

Here, the first pixel electrode PE1 and the second pixel electrode PE2 are separated from each other.

The LCD device 1 according to exemplary embodiments of the present invention may have improved visibility, which will be described below.

The first pixel electrode PE1 receives a first data voltage from the first data line DL1 through the first thin film transistor T1. The second pixel electrode PE2 receives a second data voltage from the second data line DL2 through the second thin film transistor T2. The second data voltage may be different than the first data voltage. That is, one pixel includes two domains receiving different data voltages.

Figure 2:
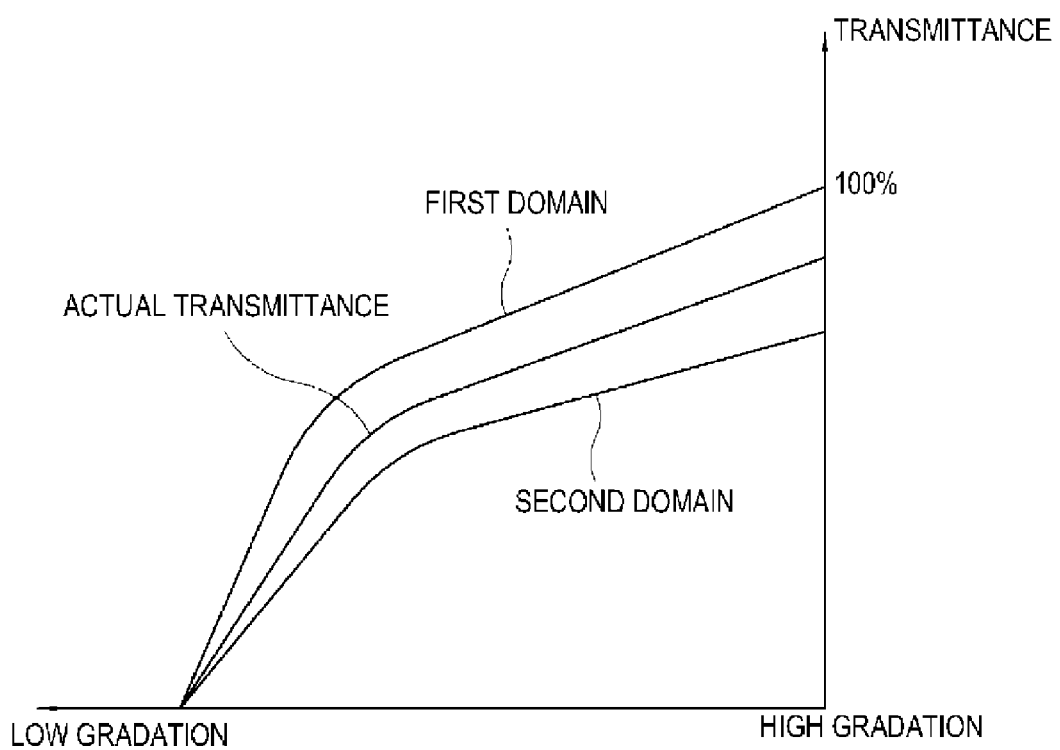
FIG. 2 illustrates a graph showing transmittance versus gradation in an LCD device according to an exemplary embodiment of the present invention.

FIG. 2 illustrates a graph showing transmittance versus gradation in an LCD device according to an exemplary embodiment of the present invention.

As shown in FIG. 2, a domain having higher brightness may correspond to the first pixel electrode PE1, and a domain having lower brightness may correspond to the second pixel electrode PE2. Thus, two domains having different gamma curves may exist in one pixel, so that brightness and color viewed from the front and lateral sides of the LCD device may partially compensate for each other, thereby improving lateral visibility.

The LCD device according to the first exemplary embodiment will now be described with reference to FIG. 3, FIG. 4, FIG. 5, and FIG. 6.

Figure 3:
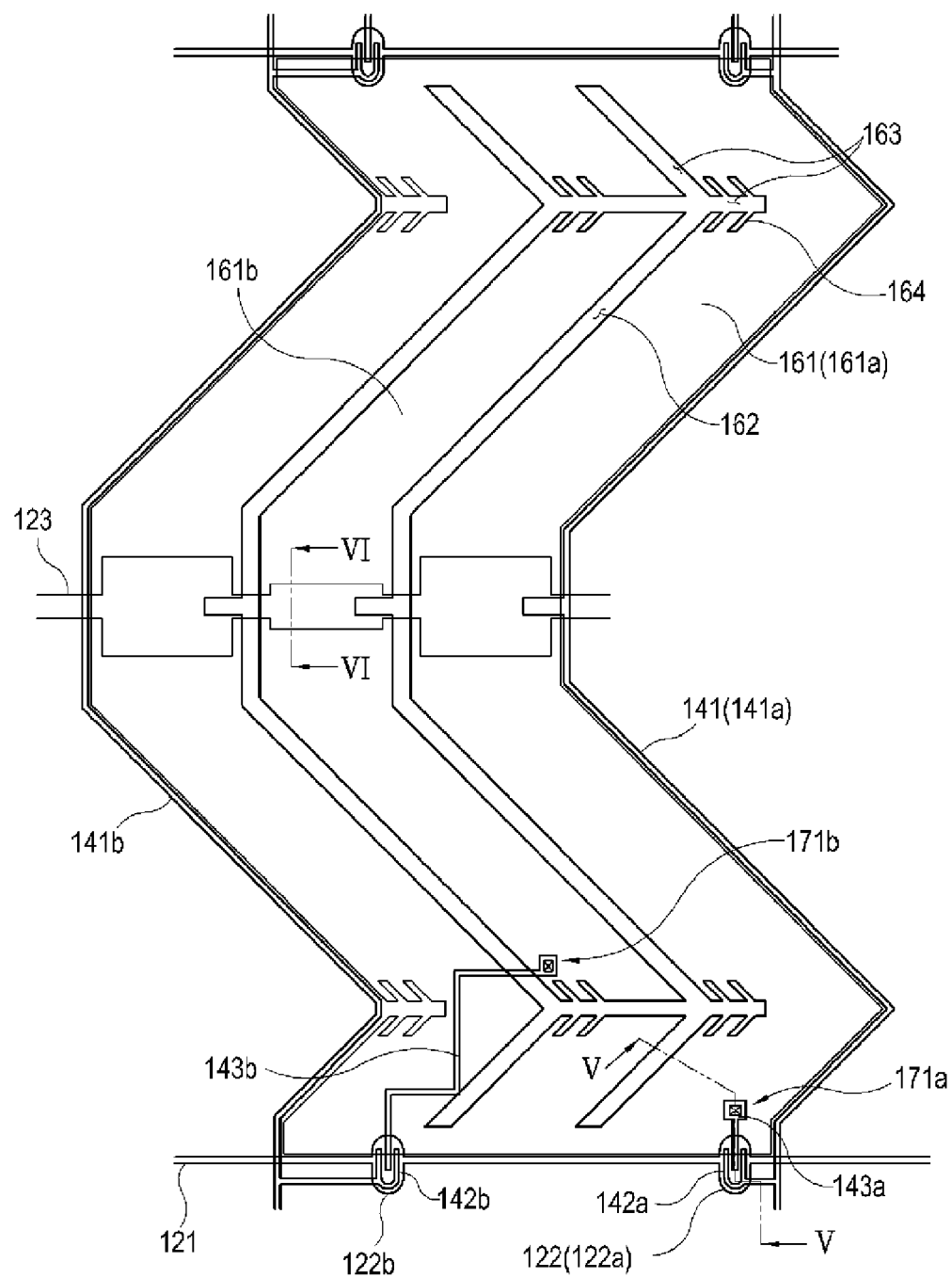
FIG. 3 and FIG. 4 are plan views illustrating an LCD device according to a first exemplary embodiment of the present invention.
Figure 4:
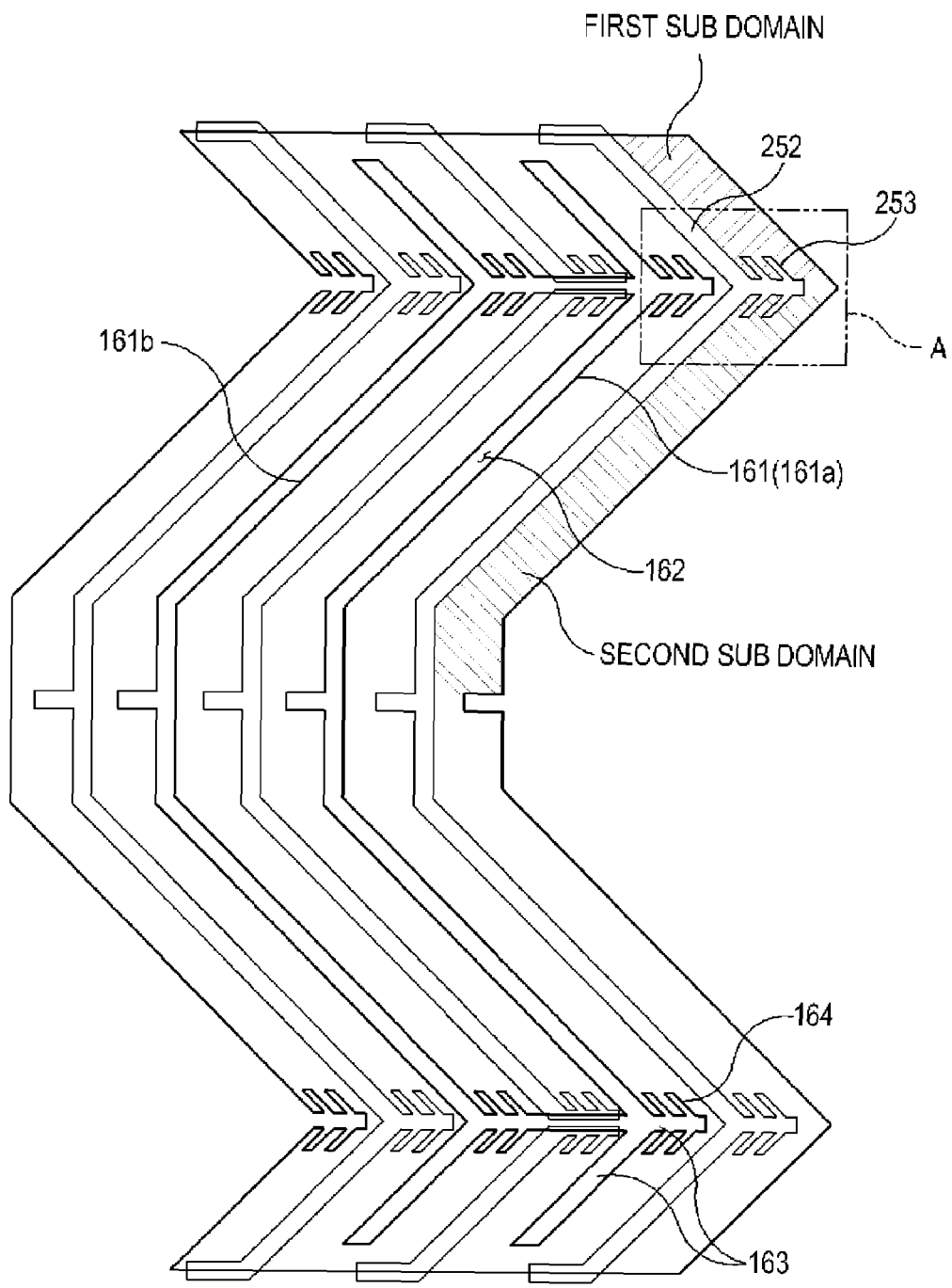
Figure 5:
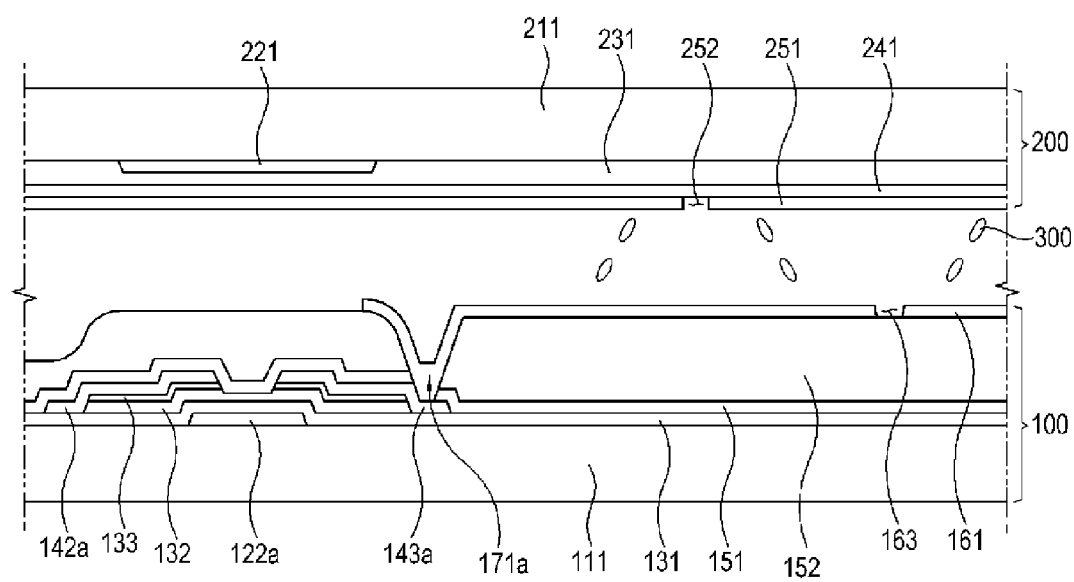
FIG. 5 is a section view taken along line V-V in FIG. 3 of the LCD device according to the first exemplary embodiment of the present invention.
Figure 6:
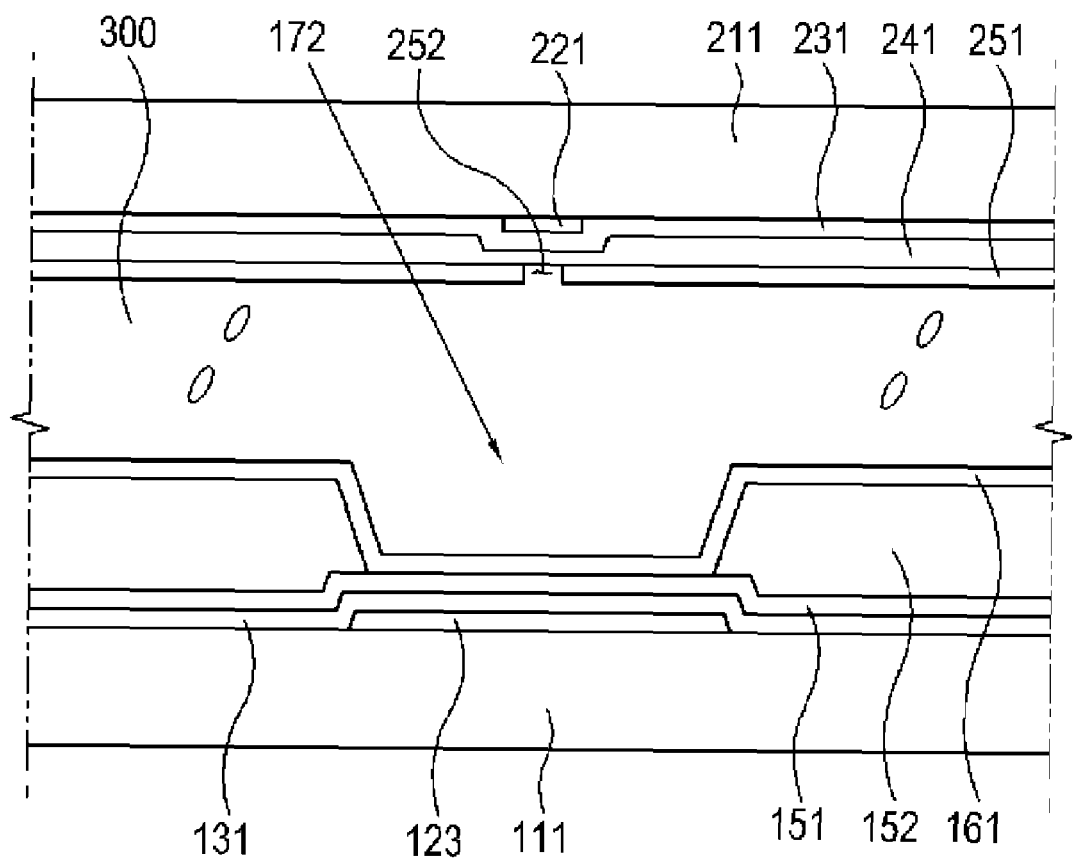
FIG. 6 is a section view taken along line VI-VI in FIG. 3 of the LCD device according to the first exemplary embodiment of the present invention.

FIG. 3 and FIG. 4 are plan views illustrating an LCD device according to a first exemplary embodiment of the present invention. FIG. 5 is a section view taken along line V-V in FIG. 3 of the LCD device according to the first exemplary embodiment of the present invention. FIG. 6 is a section view taken along line VI-VI in FIG. 3 of the LCD device according to the first exemplary embodiment of the present invention.

As shown in FIG. 5 and FIG. 6, a LCD device 1 includes a first substrate 100, a second substrate 200 opposite to the first substrate 100, and a liquid crystal layer 300 arranged between the first substrate 100 and the second substrate 200.

Hereinafter, the first substrate 100 will be described with reference to FIG. 3 and FIG. 5.

A gate wire, which includes a gate line 121, a first gate electrode 122a, a second gate electrode 122b, and a storage capacitance line 123, is arranged on a first insulating substrate 111. The gate wire may include metal and be formed as a single layer or multiple layers. The gate line 121 extends transversely, the first gate electrode 122a and the second gate electrode 122b extend from the gate line 121, and the storage capacitance line 123 extends parallel with the gate line 121 and intersects a pixel.

A gate insulating layer 131 including an insulating material such as silicon nitride ($SiN_x$) is arranged on the first insulating substrate 111 and covers the gate wire.

A semiconductor layer 132 may be made of amorphous silicon or polysilicon and is arranged on the gate insulating layer 131 in a region corresponding to the first gate electrode 122a. An ohmic contact layer 133 including n+ hydrogenated amorphous silicon highly doped with an n-type dopant is arranged on the semiconductor layer 132. The ohmic contact layer 133 is not included in a channel part between a first source electrode 142a and a first drain electrode 143a. A semiconductor layer (not shown) and an ohmic contact layer (not shown) are also arranged on the gate insulating layer 131 in a region corresponding to the second gate electrode 122b.

A data wire including a first data line 141a and a second data line 141b, the first source electrode 142a, the second source electrode 142b, a first drain electrode 143a, and a second drain electrode 143b is arranged on the ohmic contact layer 133 and the gate insulating layer 131. The data wire may include metal and be formed as a single layer or multiple layers. The first thin film transistor T1 is connected to the first data line 141a, which may be arranged on the right side of the pixel, and the second thin film transistor T2 is connected to the second data line 141b, which may be arranged on the left side of the pixel. The first data line 141a and the second data line 141b may be bent but extend predominantly vertically as shown in FIG. 3 and cross with the gate line 121 to define a pixel. The first source electrode 142a extends from the first data line 141a and extends to an upper part of the ohmic contact layer 133, and the first drain electrode 143a is separated from the first source electrode 142a and arranged on the ohmic contact layer 133 opposite to the first source electrode 142a. The second source electrode 142b extends from the second data line 141b and extends to an upper part of an ohmic contact layer (not shown), and the second drain electrode 143b is separated from the second source electrode 142b and arranged on the ohmic contact layer (not shown) opposite to the second source electrode 142b.

The first gate electrode 122a, the first source electrode 142a, and the first drain electrode 143a are elements of the first thin film transistor T1. The second gate electrode 122b, the second source electrode 142b, and the second drain electrode 143b are elements of the second thin film transistor T2.

A passivation layer 151 including an insulating material such as silicon nitride ($SiN_x$) is arranged on the data wire and exposed portions of the semiconductor layer 132 not covered by the data wire.

An organic layer 152 is arranged on the passivation layer 151. The organic layer 152 may be thicker than the gate insulating layer 131 and the passivation layer 151. The organic layer 152 may be formed by a method such as spin coating, slit coating, or screen printing. The organic layer 152 may be one of benzocyclobutene (BCB) series, olefin series, acrylic resin series, polyimide series, and fluorine resin.

A first contact hole 171a, a second contact hole 171b, and an opening 172 as shown in FIG. 6 are arranged in the organic layer 152. The first contact hole 171a and the second contact hole 171b are also arranged in the passivation layer 151, and expose the first drain electrode 143a and the second drain electrode 143b, respectively. The opening 172 corresponds to the storage capacitance line 123 and exposes the passivation layer 151. The organic layer 152 is not arranged in the opening 172.

The pixel electrode 161 is arranged on the organic layer 152. The pixel electrode 161 may include a transparent conductive material such as indium tin oxide (ITO) or indium zinc oxide (IZO).

The pixel electrode 161 extends along the extension direction of the first data line 141a and the second data line 141b and may be bent three times. The pixel electrode 161 may have a structure symmetrical about a horizontal line. The storage capacitance line 123 crosses with a bending part of the pixel electrode 161.

The pixel electrode 161 includes a first pixel electrode 161a and a second pixel electrode 161b separated from each other by a first pixel electrode cutting pattern 162. The second pixel electrode 161b may have a chevron shape according to the bent shape of the pixel electrode 161, and is positioned in a center region of the pixel. The first pixel electrode 161a may surround the second pixel electrode 161b, and the area of the first pixel electrode 161a may be larger than the area of the second pixel electrode 161b.

The first pixel electrode 161a is connected to the drain electrode 143a of the first thin film transistor T1 through the first contact hole 171a. The second pixel electrode 161b is connected to the drain electrode 143b of the second thin film transistor T2 through the second contact hole 171b.

As shown in FIG. 6, the pixel electrode 161 is arranged closer to the storage capacitance line 123 through the opening 172 since the organic layer 152 is not arranged between the pixel electrode 161 and the storage capacitance line 123 in the opening 172. A storage capacitance Cst is formed between the pixel electrode 161 receiving a pixel voltage and the storage capacitance line 123 receiving a common voltage. The organic layer 152 is removed in the opening 172 because the organic layer 152 may be too thick and may have permittivity that is too low to form the storage capacitance Cst between the pixel electrode 161 and the storage capacitance line 123.

Referring back to FIG. 3, the storage capacitance line 123 overlaps more with the first pixel electrode 161a than with the second pixel electrode 161b because the domain corresponding to the larger first pixel electrode 161a may use a higher storage capacitance Cst.

A second pixel electrode cutting pattern 163 is arranged in both the first pixel electrode 161a and the second pixel electrode 161b. A part of the second pixel electrode cutting pattern 163 extends parallel with portions of the first data line 141a and the second data line 141b, and another part of the second pixel electrode cutting pattern 163 extends parallel with the gate line 121.

The first pixel electrode cutting pattern 162 and the second pixel electrode cutting pattern 163, together with a common electrode cutting pattern 252 described below, divide the liquid crystal layer 300 into sub domains.

In exemplary embodiments of the present invention, the sub domains are surrounded by the first pixel electrode cutting pattern 162 or an edge of the pixel electrode 161, the second pixel electrode cutting pattern 163, and the common electrode cutting pattern 252, and extend in an oblique direction. In FIG. 4, a hatched area indicates a first sub domain and a dotted area indicates a second sub domain within a domain. The first sub domain and the second sub domain neighbor each other in the extension direction of the first data line 141a and the second data line 141b. Further, the first sub domain and the second sub domain extend at an approximately right angle to each other.

As shown in FIG. 3, first sub cutting patterns 164 are arranged in upper and lower regions of the bending part of the pixel electrode 161. The first sub cutting pattern 164 is connected to the first pixel electrode cutting pattern 162 and the second pixel electrode cutting pattern 163, and extends in the extension direction of the first data line 141a and the second data line 141b.

Hereinafter, the second substrate 200 will be described with reference to FIG. 4 and FIG. 5.

FIG. 4 illustrates an arrangement between a pixel electrode 161 of the first substrate 100 and a common electrode cutting pattern 252 of the second substrate 200.

A black matrix 221 is arranged on a second insulating substrate 211. In general, the black matrix 221 may include a photosensitive organic material with a black pigment. The black pigment may include carbon black or titanium oxide.

Figure 8:
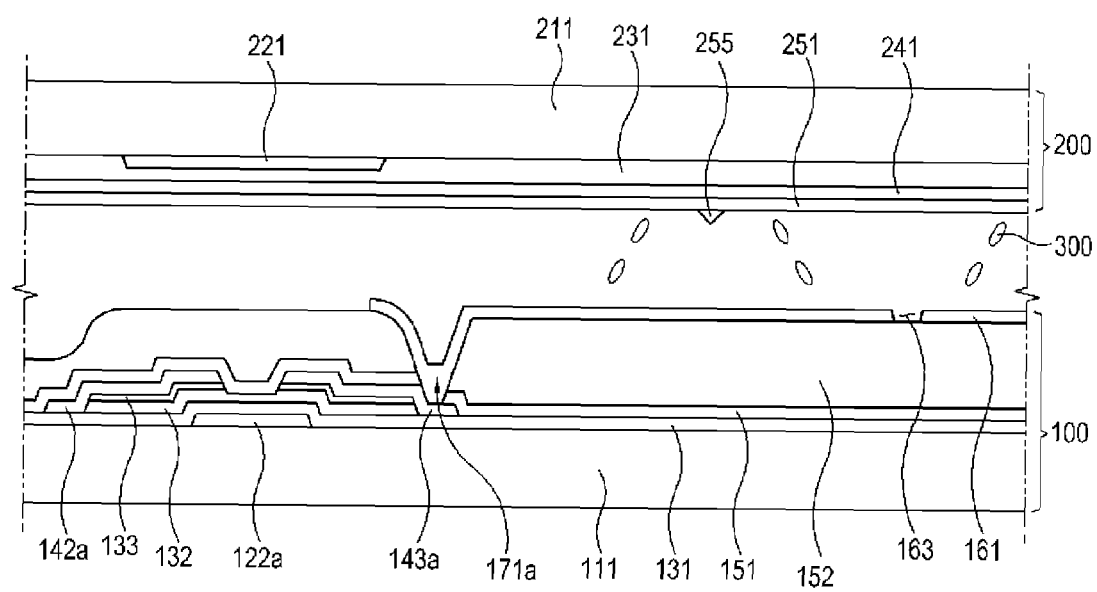
FIG. 8 illustrates a section view of an LCD device according to a second exemplary embodiment of the present invention.

A color filter layer 231 is arranged on the second insulating layer 211 and the black matrix 221. The color filter layer 231 may include sub layers with different colors, such as red sub layers, green sub layers, and blue sub layers, each corresponding to a pixel. The color filter layer 231 may be continuous in a region corresponding to the black matrix 221 between adjacent pixels as shown in FIG. 5 and FIG. 8, or may be discontinuous (not shown).

An overcoat layer 241 may be arranged on the color filter layer 231 to planarize the second substrate 200.

The common electrode 251 is arranged on the overcoat layer 241. The common electrode 251 includes a transparent conductive material such as indium tin oxide (ITO) or indium zinc oxide (IZO). The common electrode 251 receives a common voltage, and the potential difference between the common electrode 251 and the pixel electrode 161 of the first substrate 100 generates an electric field across the liquid crystal layer 300.

A common electrode cutting pattern 252 is arranged in the common electrode 251. As shown in FIG. 4, a part of the common electrode cutting pattern 252 extends parallel with the first pixel electrode cutting pattern 162, and another part of the common electrode cutting pattern 252 extends parallel with the gate line 121.

A second sub cutting pattern 253 connected to the common electrode cutting pattern 252 is arranged corresponding to upper regions and lower regions of the bending part in the pixel electrode 161. The second sub cutting pattern 253 extends parallel with the first data line 141a and the second data line 141b.

The arrangements of the first pixel electrode cutting pattern 162, the second pixel electrode cutting pattern 163, and the common electrode cutting pattern 252 are not limited to those in the first exemplary embodiment. For example, the first pixel electrode cutting pattern 162, the second pixel electrode cutting pattern 163, and the common electrode cutting pattern 252 may be formed in various shapes, including those shapes and arrangements disclosed below.

As shown in FIG. 5, the liquid crystal layer 300 is disposed between the first substrate 100 and the second substrate 200. The liquid crystal layer 300 is in a vertically aligned (VA) mode, in which long axes of liquid crystal molecules are vertically aligned when an electric field is not generated across the liquid crystal layer 300.

When receiving a voltage, the liquid crystal molecules are aligned perpendicularly to an applied electric field due to negative dielectric anisotropy. If the first pixel electrode cutting pattern 162, the second pixel electrode cutting pattern 163, and the common electrode cutting pattern 252 are not included in the LCD device 1, the liquid crystal molecules may be oriented in irregular directions where the electric fields are disrupted, thereby forming a disclination line along a boundary between the liquid crystal molecules having disrupted orientations.

The first pixel electrode cutting pattern 162, the second pixel electrode cutting pattern 163, and the common electrode cutting pattern 252 form a fringe electric field and determine the lying direction of the liquid crystal alignment when an electric field is generated across the liquid crystal layer 300.

Figure 7:
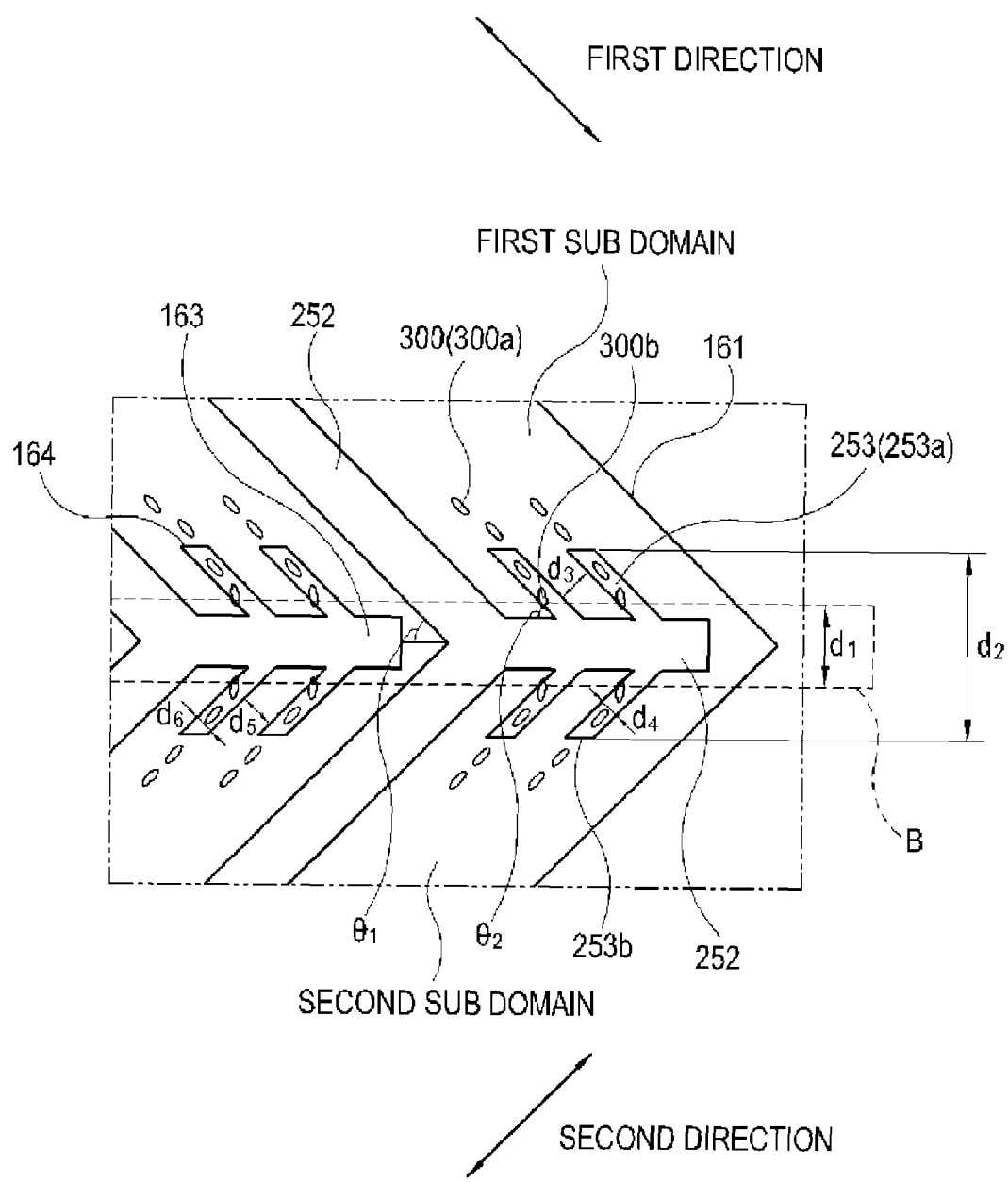
FIG. 7 is an enlarged view of region "A" shown in FIG. 4.

An aperture ratio of the LCD device 1 is improved by first sub cutting pattern 164 and the second sub cutting pattern 253. The aperture ratio improvement will be described with reference to the second sub cutting pattern 253 arranged in the common electrode 251 in FIG. 7 by way of example.

A first sub domain is elongated in the first direction and a second sub domain is elongated in the second direction. In the exemplary embodiment, the first direction is perpendicular to the second direction, and the angle θ1 between the first direction and the gate line 121 is about 45°. A bending region, which may be referred to as a boundary region, is arranged between the first sub domain and the second sub domain.

The second sub cutting pattern 253 includes a first part 253a extending from the bending region (the boundary region) to the first sub domain, and a second part 253b extending from the bending region to the second sub domain. The first part 253a and the second part 253b extend in parallel with the first direction of the first sub domain and the second direction of the second sub domain, respectively. Thus, the angel θ2 between the first part 253a and the gate line 121 is about 45°, and the extension direction of the first part 253a is perpendicular to the extension direction of the second part 253b.

A liquid crystal director of a liquid crystal layer 300 in the first sub domain is aligned almost in parallel with the first direction, and the liquid crystal director of the liquid crystal layer 300 in the second sub domain is aligned almost in parallel with the second direction.

The liquid crystal directors are perpendicular to and collide with each other in the boundary region where the first sub domain meets the second sub domain. In the drawings, the liquid crystal layer 300 is divided into a normal liquid crystal layer 300a having the liquid crystal directors aligned in the first direction or the second direction, and an abnormal liquid crystal layer 300b having the liquid crystal directors aligned in a direction different than the first direction or the second direction.

The abnormal liquid crystal layer 300b has the liquid crystal director approximately perpendicular to the gate line 121 in the boundary region. The abnormal liquid crystal layer 300b includes more randomly oriented liquid crystals, which may cause the disclination line, thereby deteriorating a display quality.

The liquid crystal layer 300 has the highest transmittance when the liquid crystal directors are aligned at an angle of 45° to a horizontal direction (if one of a pair of polarizing axes is horizontal and the other polarizing axis is vertical). However, if the angle of the liquid crystal director of the abnormal liquid crystal 300b is larger than 450, the transmittance may deteriorate.

The second sub cutting pattern 253 forms an additional electric field in the vicinity of the boundary region and minimizes the region having the abnormal liquid crystal layer 300b. By this, a width d1 of the disclination region B is reduced and the transmittance is thus improved.

If the second sub cutting pattern 253 is formed, the width of the disclination region may be 10 μm. A length d2 of the second sub cutting pattern 253 may be 5 μm to 15 μm.

An interval d3 between the second sub cutting patterns 253 may be 5.5 μm to 7.6 μm, and a width d4 of the second sub cutting pattern 253 may be 3 μm to 5 μm, but these dimensions are not limited thereto. An interval d5 between the first sub cutting patterns 164 may be 100 percent to 130 percent of the interval d3 between the second sub cutting patterns 253, and a width d6 of the first sub cutting pattern 164 may be 70 percent to 100 percent of the width d4 of the second sub cutting pattern 164, but these dimensions are not limited thereto.

The first pixel electrode cutting pattern 162, the second pixel electrode cutting pattern 163, the common electrode cutting pattern 252 and the first sub cutting pattern 164 and the second sub cutting pattern 253 are used as domain dividers for dividing the liquid crystal layer 300 into domains. The domain dividers are not limited to the cutting pattern of the first exemplary embodiment, which has been described.

FIG. 8 illustrates a section view of an LCD device according to a second exemplary embodiment of the present invention. More specifically, FIG. 8 is a section view corresponding to line V-V in FIG. 3 of an LCD device according to a second exemplary embodiment of the present invention. The second exemplary embodiment will be described with reference to FIG. 8.

As shown in FIG. 8, the common electrode 251 is not patterned and a protrusion 255 is arranged in a position corresponding to the common electrode cutting pattern 252 of the first exemplary embodiment. The protrusion 255 may be made of an organic material and, together with the first pixel electrode cutting pattern 162 and the second pixel electrode cutting pattern 163, divides the liquid crystal layer 300 into sub domains like the common electrode cutting pattern 252.

Further, a sub protrusion (not shown) may be arranged on the common electrode 251 instead of the second sub cutting pattern 253 of the first exemplary embodiment.

In another exemplary embodiment, a sub protrusion may be arranged in a position corresponding to the first sub cutting pattern 164 of the first exemplary embodiment.

Figure 9:
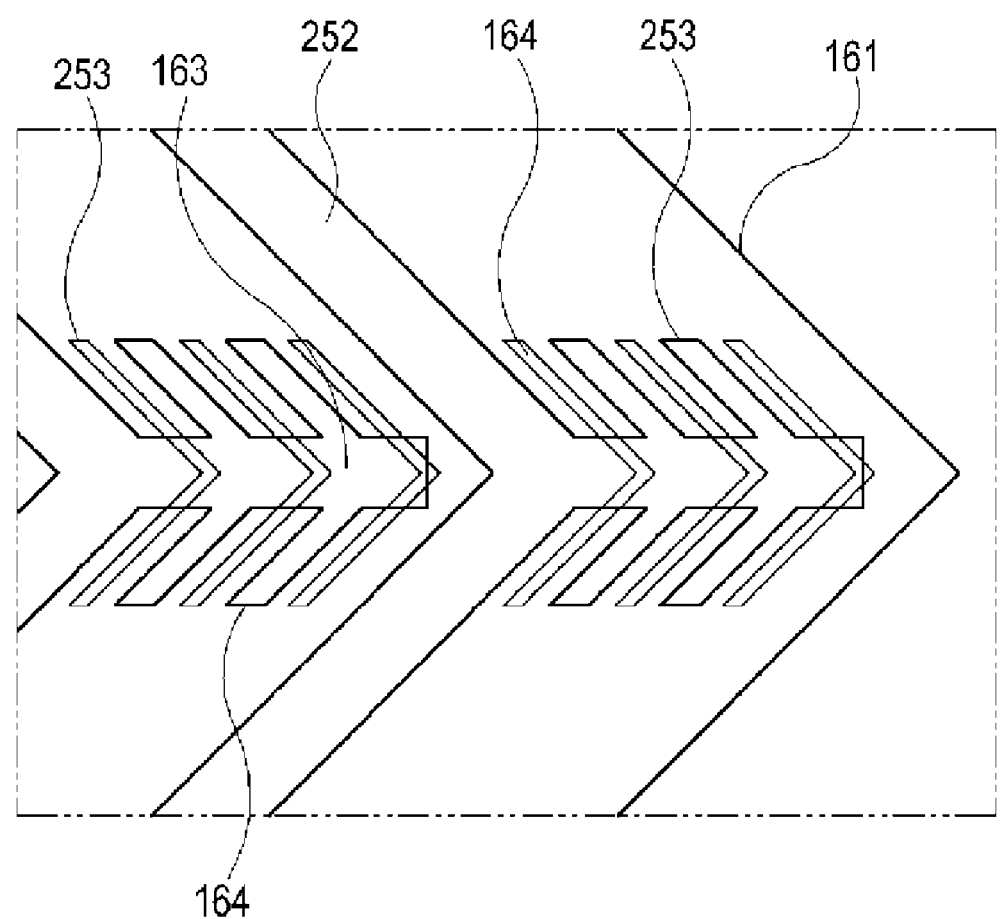
FIG. 9 illustrates a plan view of an LCD device according to a third exemplary embodiment of the present invention.

FIG. 9 illustrates a plan view of an LCD device according to a third exemplary embodiment of the present invention. More specifically, FIG. 9 is a plan view corresponding to region A in FIG. 4 of an LCD device according to a third exemplary embodiment of the present invention. The third exemplary embodiment will be described with reference to FIG. 9.

The first sub cutting patterns 164 are arranged to alternate with the second sub cutting patterns 253 such that a second sub cutting pattern 253 is arranged between first sub cutting patterns 164, and a first sub cutting pattern 164 is arranged between second sub cutting patterns 253.

According to the third exemplary embodiment, the first sub cutting patterns 164 and the second sub cutting patterns 253 are densely arranged so that the width of the disclination region B having the abnormal liquid crystal layer 300b can be further reduced.

In another exemplary embodiment, the first sub cutting pattern 164 and the second sub cutting pattern 253 may partially or completely overlap each other.

Figure 10:
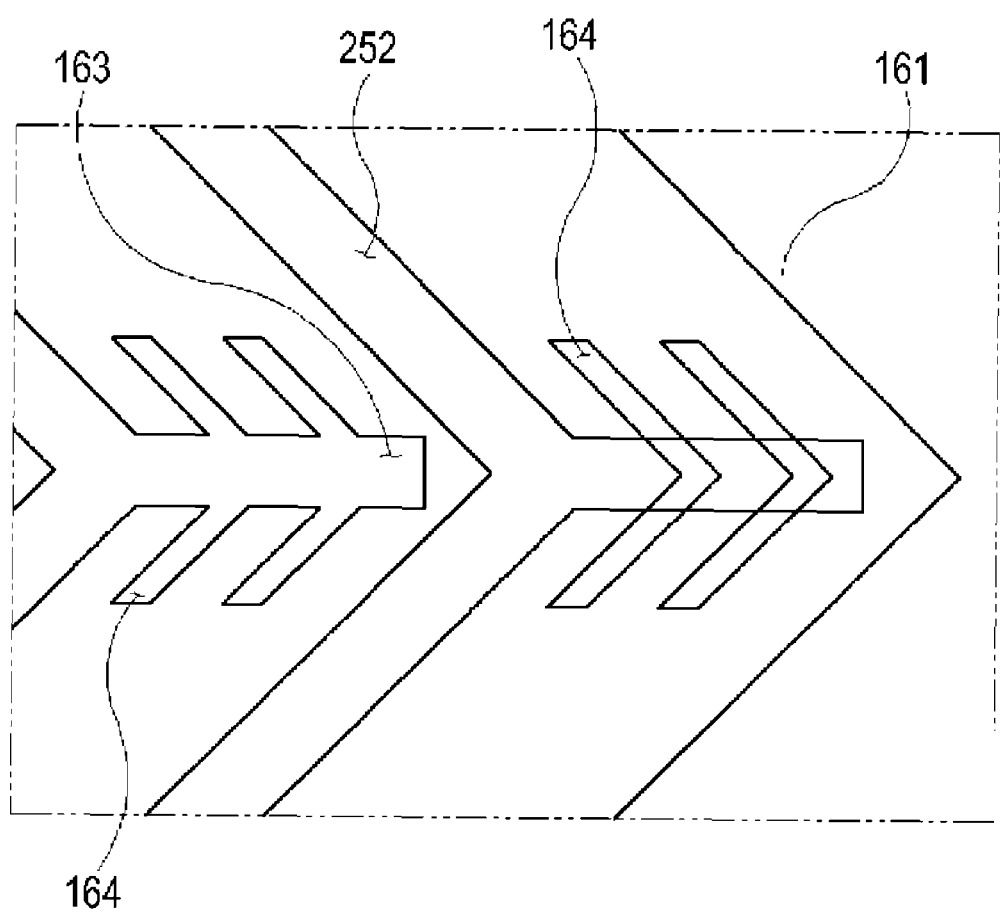
FIG. 10 illustrates a plan view of an LCD device according to a fourth exemplary embodiment of the present invention.

FIG. 10 illustrates a plan view of an LCD device according to a fourth exemplary embodiment of the present invention. More specifically, FIG. 10 is a plan view corresponding to region A in FIG. 4 of an LCD device according to a fourth exemplary embodiment of the present invention. The fourth exemplary embodiment will be described with reference to FIG. 10.

A common electrode 251 according to a fourth exemplary embodiment of the present invention includes the common electrode cutting pattern 252, but does not include the second sub cutting pattern 253. In substitution, a first sub cutting pattern 164 is provided in a position corresponding to the second sub cutting pattern 253 of the first exemplary embodiment.

In other exemplary embodiment, the first sub cutting pattern 164 may not be arranged in the pixel electrode 161, and the second sub cutting pattern 253 may be arranged in the common electrode 251.

Figure 11:
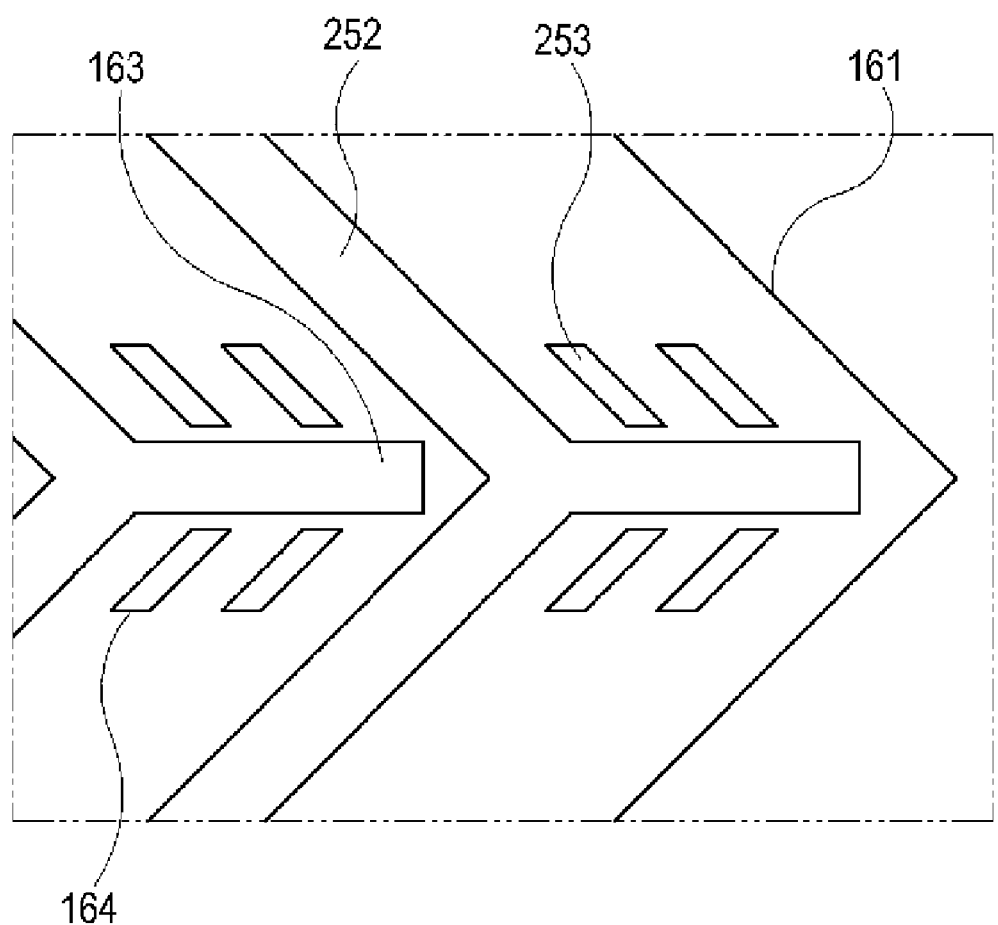
FIG. 11 illustrates a plan view of an LCD device according to a fifth exemplary embodiment of the present invention.

FIG. 11 illustrates a plan view of an LCD device according to a fifth exemplary embodiment of the present invention. More specifically, FIG. 11 is a plan view corresponding to region A in FIG. 4 of an LCD device according to a fifth exemplary embodiment of the present invention. The fifth exemplary embodiment will be described with reference to FIG. 11.

In the fifth exemplary embodiment, a first sub cutting pattern 164 is separated from a second pixel electrode cutting pattern 163, and a second sub cutting pattern 253 is separated from a common electrode cutting pattern 252.

Figure 12:
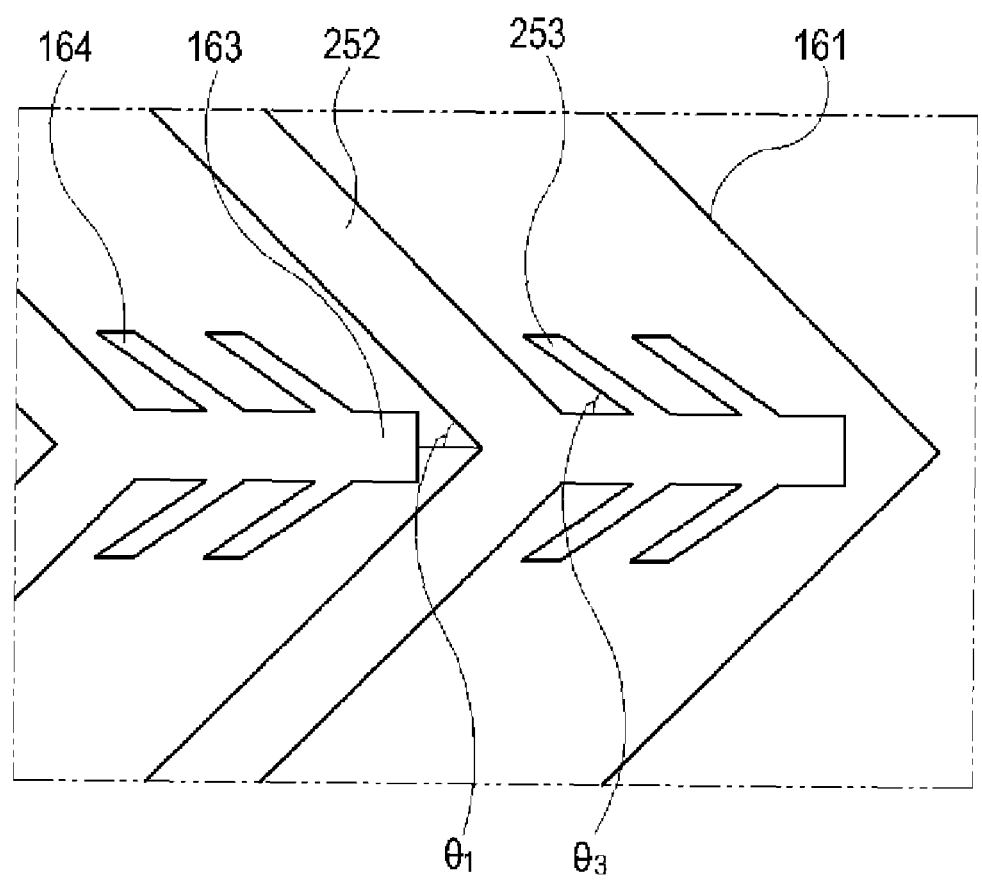
FIG. 12 illustrates a plan view of an LCD device according to a sixth exemplary embodiment of the present invention.

FIG. 12 illustrates a plan view of an LCD device according to a sixth exemplary embodiment of the present invention. More specifically, FIG. 12 is a plan view corresponding to region A in FIG. 4 of an LCD device according to a sixth exemplary embodiment of the present invention. The sixth exemplary embodiment will be described with reference to FIG. 12.

In the sixth exemplary embodiment, an angle between a second sub cutting pattern 253 and a gate line 121 is relatively small. More specifically, an angle $\theta 3$ between a second sub cutting pattern 253 and a gate line 121 is less than 45°. The angle $\theta 3$ between the second sub cutting pattern 253 and the gate line 121 may be 25° to 40°.

According to a sixth exemplary embodiment, an electric field formed across sub cutting patterns 164 and 253 has an increased effect on the liquid crystal director of an abnormal liquid crystal layer 300b, thereby further reducing the width of the disclination region B having the abnormal liquid crystal layer 300b.

Figure 13:
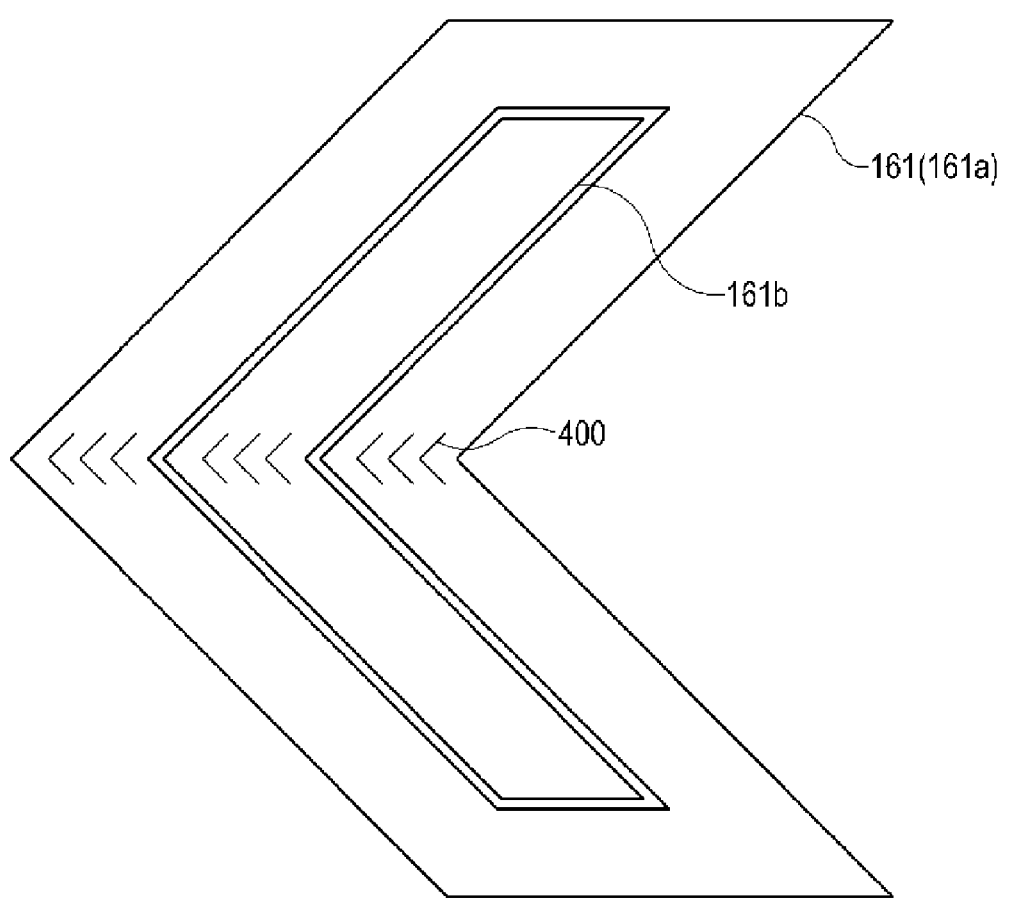
FIG. 13 illustrates a plan view of an LCD device according to a seventh exemplary embodiment of the present invention.

FIG. 13 illustrates a plan view of an LCD device according to a seventh exemplary embodiment of the present invention. More specifically, FIG. 13 is a plan view corresponding to region A in FIG. 4 of an LCD device according to a seventh exemplary embodiment of the present invention. The seventh exemplary embodiment will be described with reference to FIG. 13.

Pixel electrodes 161 have a chevron shape, and are bent once along the extension direction of a first data line 141a and/or a second data line 141b. The pixel electrode 161 includes a first pixel electrode 161a and a second pixel electrode 161b, which are separated from each other.

A sub cutting pattern 400 is arranged in a bending part along an extension direction of the gate line 121, and the sub cutting pattern 400 may extend in a direction of a first data line 141a and/or a second data line 141b. The sub cutting pattern 400 may be arranged in the pixel electrode 161 and/or the common electrode 251.

Figure 14:
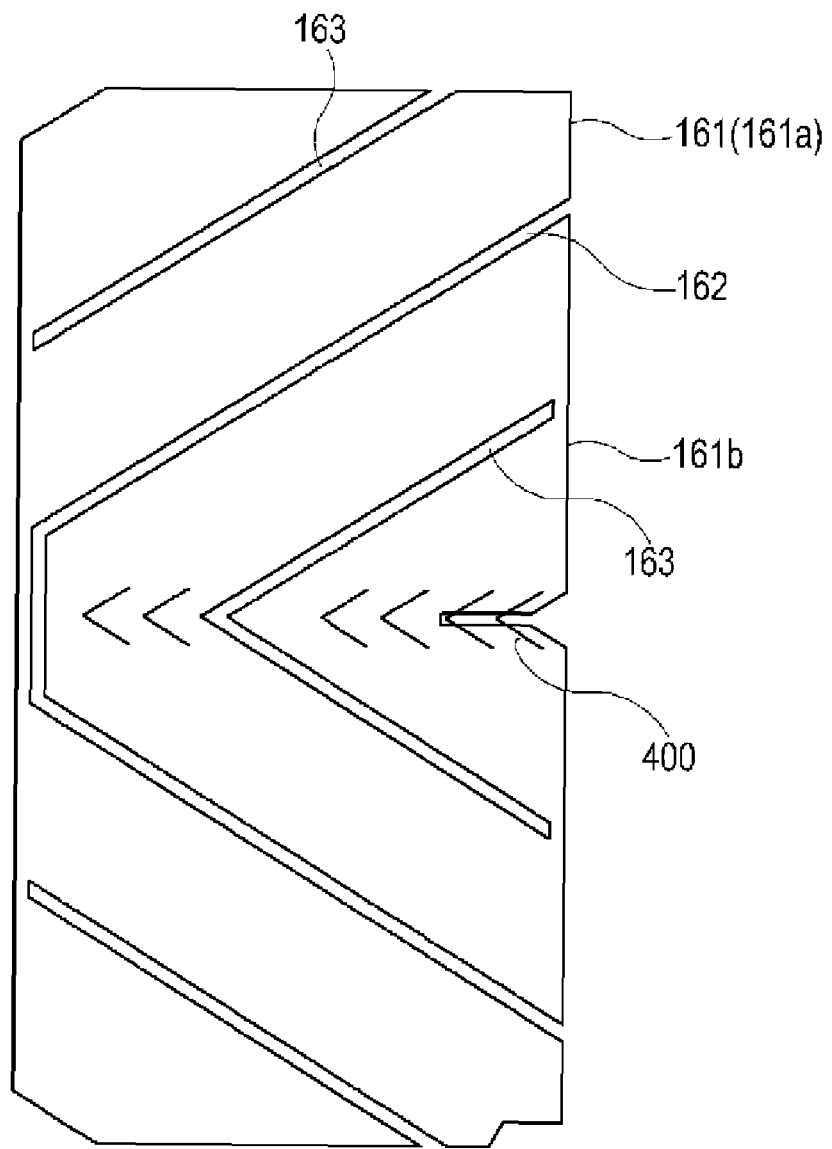
FIG. 14 illustrates a plan view of an LCD device according to an eighth exemplary embodiment of the present invention.

FIG. 14 illustrates a plan view of an LCD device according to an eighth exemplary embodiment of the present invention. More specifically, FIG. 14 is a plan view corresponding to region A in FIG. 4 of an LCD device according to an eighth exemplary embodiment of the present invention. The eighth exemplary embodiment will be described with respect to FIG. 14.

Pixel electrodes 161 have an approximately rectangular shape, and include a first pixel electrode 161a and a second pixel electrode 161b, which are separated from each other.

The pixel electrodes 161 have generally rectangular shape, but have a region where the electric fields collide with each other in the first pixel electrode cutting pattern 162 and the second pixel electrode cutting pattern 163. A sub cutting pattern 400 is arranged in the region where the electric fields collide with each other.

Figure 15:
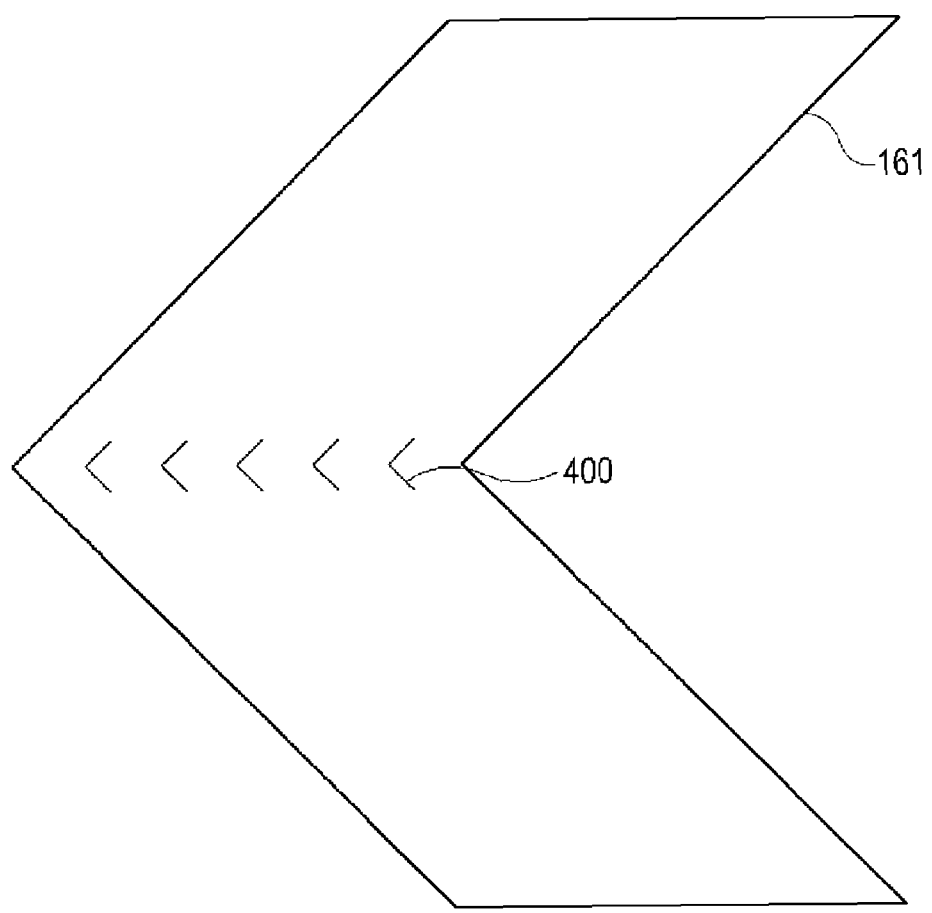
FIG. 15 illustrates a plan view of an LCD device according to a ninth exemplary embodiment of the present invention.

FIG. 15 illustrates a plan view of an LCD device according to a ninth exemplary embodiment of the present invention. More specifically, FIG. 15 is a plan view corresponding to region A in FIG. 4 of an LCD device according to a ninth exemplary embodiment of the present invention. The ninth exemplary embodiment will be described with reference to FIG. 15.

A pixel electrode 161 has a chevron shape and is bent once along an extension direction of a first data line 141a and/or a second data line 141b. Although a cutting pattern is not shown, the pixel electrode 161 is wholly connected.

A sub cutting pattern 400 is arranged in a bending part along an extension direction of the gate line 121, and the sub cutting pattern 400 may extend in a direction of a first data line 141a and/or a second data line 141b.

Figure 16:
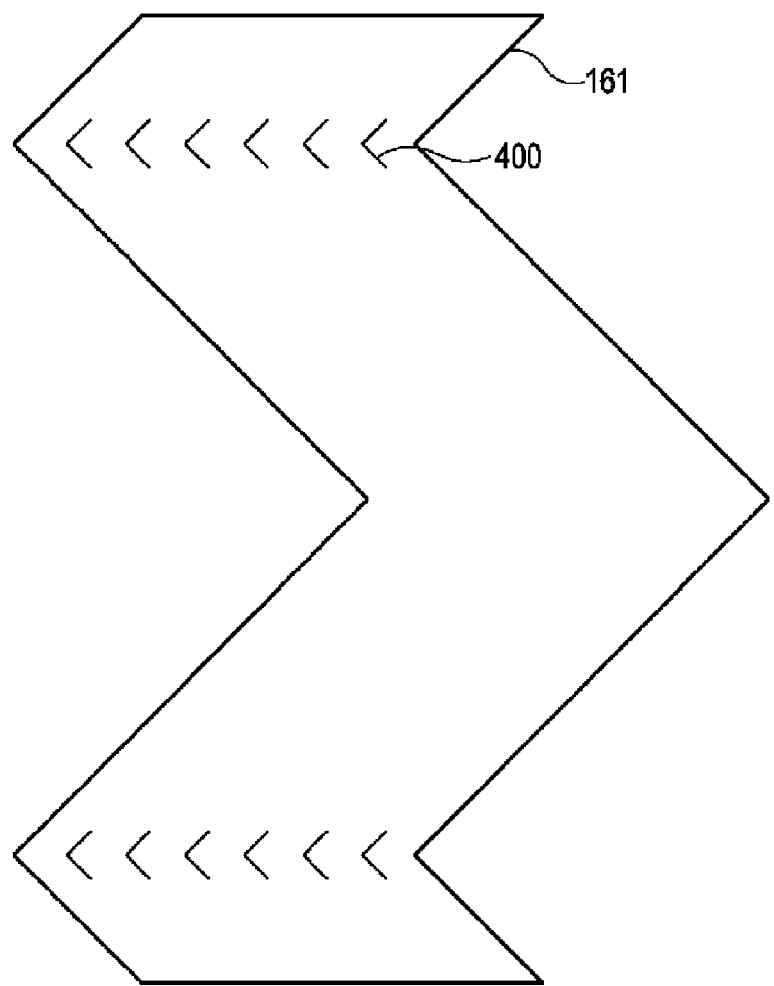
FIG. 16 illustrates a plan view of an LCD device according to a tenth exemplary embodiment of the present invention.

FIG. 16 illustrates a plan view of an LCD device according to a tenth exemplary embodiment of the present invention. More specifically, FIG. 16 is a plan view corresponding to region A in FIG. 4 of an LCD device according to a tenth exemplary embodiment of the present invention. The tenth exemplary embodiment will be described with reference to FIG. 16.

A pixel electrode 161 is bent three times along an extension direction of a first data line 141a and/or a second data line 141b. Although a cutting pattern is not shown, the pixel electrode 161 is wholly connected.

A sub cutting pattern 400 is arranged in a bending part along an extension direction of the gate line 121, and the sub cutting pattern 400 may extend in a direction of a first data line 141a and/or a second data line 141b.

As described above, the present invention provides an LCD device which has an enhanced transmittance.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a pixel electrode comprising a first pixel electrode and a second pixel electrode in a pixel area of the first substrate;
   a second substrate facing the first substrate;
   a liquid crystal layer interposed between the first substrate and the second substrate; and
   at least one sub cutting pattern disposed between the first pixel electrode and the second pixel electrode,
   wherein the liquid crystal layer comprises a first portion disposed on the first pixel electrode and a second portion disposed on the second pixel electrode,
   wherein the first electrode pixel is configured to generate a first electric field in the first portion, the second electrode pixel is configured to generate a second electric field in the second portion, and the first electric field is different from the second electric field,
   wherein a first domain having a first brightness and a second domain having a second brightness different from the first brightness are formed in the pixel area,
   wherein the at least one sub cutting pattern comprises a first part extending toward the first domain and a second part extending toward the second domain, and
   wherein the at least one sub cutting pattern has a chevron shape.

2. The liquid crystal display device of claim 1, further comprising a main cutting pattern disposed between the first pixel electrode and the second pixel electrode.

3. The liquid crystal display device of claim 2, wherein the first pixel electrode and the second pixel electrode are separated from each other by the main cutting pattern.

4. The liquid crystal display device of claim 2, wherein the at least one sub cutting pattern is extended from the main cutting pattern.

5. The liquid crystal display device of claim 4, wherein an extension direction of the at least one sub cutting pattern is not parallel to an extension direction of the main cutting pattern.

6. The liquid crystal display device of claim 1, further comprising a first thin film transistor comprising a first gate line and a first date line, and
   a second thin film transistor a second gate line and a second data line,
   wherein the first pixel electrode receives a first data voltage from the first data line and the second pixel electrode receives a second data voltage from the second data line, and
   wherein the first data voltage is different from the second data voltage.

7. The liquid crystal display device of claim 6, the first gate line and the second gate line are the same gate line.

8. The liquid crystal display device of claim 7,
   wherein the first domain corresponds to the first pixel electrode and the second domain corresponds to the second pixel electrode.

9. The liquid crystal display device of claim 1, wherein the first domain comprises a liquid crystal director disposed in a first direction and the second domain comprises a liquid crystal director disposed in a second direction different than the first direction, and
   wherein an extension direction of the first part is substantially parallel with the first direction and an extension direction of the second part is substantially parallel with the second direction.

10. The liquid crystal display device of claim 6, wherein an angle between an extension direction of the first domain and the first gate line is larger than an angle between an extension direction of the first part and the first gate line, and
    an angle between an extension direction of the second domain and the first gate line is larger than an angle between an extension direction of the second part and the first gate line.

11. The liquid crystal display device of claim 1, wherein the first substrate comprises a gate line and a data line insulated from and crossing with each other, and the pixel electrode connected to the gate line and the data line, the pixel electrode comprising a first domain divider,
    wherein the second substrate comprises a common electrode comprising a second domain divider,
    wherein the pixel area comprises sub domains divided by the first domain divider and the second domain divider, the sub domains comprising:
    a first sub domain having a liquid crystal director disposed in a first direction, and
    a second sub domain having a liquid crystal director disposed in a second direction different than the first direction,
    wherein the first sub domain and the second sub domain are divided by a boundary part extending in parallel direction to the gate line, and
    wherein the common electrode comprises at least one sub cutting pattern extending from the boundary part toward at least one of the first sub domain and the second sub domain.

12. The liquid crystal display device of claim 11, wherein at least a part of the sub cutting patterns is connected to the first domain divider.

13. The liquid crystal display device of claim 11, wherein at least a part of the sub cutting patterns is connected to the second domain divider.

14. The liquid crystal display device of claim 11, wherein the liquid crystal layer is in a vertically aligned mode.

15. The liquid crystal display device of claim 14, wherein the pixel electrode is bent once along an extension direction of the data line.

16. The liquid crystal display device of claim 14, wherein the pixel electrode is bent three times along an extension direction of the data line.

17. The liquid crystal display device of claim 11, wherein at least one of the first domain divider and the second domain divider comprises a cutting pattern.

18. The liquid crystal display device of claim 11, wherein at least one of the first domain divider and the second domain divider comprises a protrusion.

19. A liquid crystal display device, comprising:
a first substrate;
a pixel electrode comprising a first pixel electrode and a second pixel electrode in a pixel area of the first substrate;
a second substrate facing the first substrate;
a liquid crystal layer interposed between the first substrate and the second substrate; and
at least one sub cutting pattern disposed between the first pixel electrode and the second pixel electrode,
wherein the liquid crystal layer comprises a first portion disposed on the first pixel electrode and a second portion disposed on the second pixel electrode,
wherein the first electrode pixel is configured to generate a first electric field in the first portion, the second electrode pixel is configured to generate a second electric field in the second portion, and the first electric field is different from the second electric field, and
wherein a width of the at least one sub cutting pattern is about 3 μm to about 5 μm.

20. A liquid crystal display device, comprising:
a first substrate;
a pixel electrode comprising a first pixel electrode and a second pixel electrode in a pixel area of the first substrate;
a second substrate facing the first substrate;
a liquid crystal layer interposed between the first substrate and the second substrate; and
at least one sub cutting pattern disposed between the first pixel electrode and the second pixel electrode,
wherein the liquid crystal layer comprises a first portion disposed on the first pixel electrode and a second portion disposed on the second pixel electrode,
wherein the first electrode pixel is configured to generate a first electric field in the first portion, the second electrode pixel is configured to generate a second electric field in the second portion, and the first electric field is different from the second electric field, and
wherein an interval between the sub cutting patterns is about 5.5 μm to about 7.6 μm.

* * * * *